United States Patent
Rothman et al.

(10) Patent No.: US 7,596,714 B2
(45) Date of Patent: Sep. 29, 2009

(54) METHODS AND APPARATUS TO MANAGE THROTTLING IN COMPUTING ENVIRONMENTS

(75) Inventors: Michael A. Rothman, Puyallup, WA (US); Vincent J. Zimmer, Federal Way, WA (US); Robert C. Swanson, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 11/561,653

(22) Filed: Nov. 20, 2006

(65) Prior Publication Data

US 2008/0120485 A1  May 22, 2008

(51) Int. Cl.
*G06F 11/00* (2006.01)
(52) U.S. Cl. .............................. 714/8; 714/47; 702/99; 702/132
(58) Field of Classification Search .................. 714/8, 714/47; 702/99, 132
See application file for complete search history.

(56) References Cited

U.S. PATENT DOCUMENTS

| | | | |
|---|---|---|---|
| 5,493,676 A * | 2/1996 | Amundson | 714/42 |
| 5,590,061 A * | 12/1996 | Hollowell et al. | 702/130 |
| 6,237,110 B1 * | 5/2001 | Lin et al. | 714/7 |
| 6,373,768 B2 * | 4/2002 | Woo et al. | 365/211 |
| 6,425,092 B1 * | 7/2002 | Evans et al. | 714/13 |
| 6,490,691 B1 * | 12/2002 | Kimura et al. | 714/8 |
| 6,564,288 B2 * | 5/2003 | Olarig et al. | 711/105 |
| 6,735,546 B2 * | 5/2004 | Scheuerlein | 702/132 |
| 6,925,409 B2 * | 8/2005 | Smith et al. | 702/132 |
| 7,370,242 B2 * | 5/2008 | Chen et al. | 714/47 |
| 7,409,594 B2 * | 8/2008 | Mukherjee et al. | 714/26 |
| 2003/0174559 A1 * | 9/2003 | Cooper et al. | 365/200 |
| 2003/0191889 A1 * | 10/2003 | Forrer, Jr. | 711/112 |
| 2004/0260967 A1 * | 12/2004 | Guha et al. | 714/3 |
| 2005/0216221 A1 * | 9/2005 | Broyles et al. | 702/132 |
| 2006/0010353 A1 * | 1/2006 | Haugh | 714/47 |
| 2006/0075283 A1 * | 4/2006 | Hartung et al. | 714/5 |
| 2007/0106860 A1 * | 5/2007 | Foster et al. | 711/170 |
| 2007/0150225 A1 * | 6/2007 | Boerstler et al. | 702/132 |

* cited by examiner

*Primary Examiner*—Marc Duncan
(74) *Attorney, Agent, or Firm*—Hanley, Flight & Zimmerman, LLC

(57) ABSTRACT

Methods and apparatus to manage throttling in computing environments are described herein. One example method may include receiving an indication that a first memory module has reached a temperature and remapping information from the first memory module to a second memory in response to the received indication. Other methods are described.

18 Claims, 4 Drawing Sheets

METHODS AND APPARATUS TO MANAGE THROTTLING IN COMPUTING ENVIRONMENTS

FIELD OF THE DISCLOSURE

This disclosure relates generally to computing environments and, more particularly, methods and apparatus to manage throttling in computing environments.

BACKGROUND

As computing systems, such as desktop computers, laptop computers, servers, and the like, have increased in processing speed, power dissipation of system components has become a concern. In fact, failure to adequately heat sink components such as processors and memory modules results in elevated temperatures within the housing or cabinet in which the components reside. For example, failure to adequately heat sink or ventilate a server, which may have several racks of processors on printed circuit cards, may result in a temperature that exceeds the recommended operating temperatures of various components within the server housing. Such a situation may result in thermal shut down of the system or throttling of various components within the system.

Throttling system processors has been used to limit system power dissipation, however, memory subsystem power dissipation has been increasing. The introduction of fully buffered dual in-line memory modules (FB-DIMMs) has resulted in cumulative power dissipation rates that, on some platforms, exceed the processor power utilization. One of the capabilities introduced in the Advanced Memory Buffer (AMB) that is used by the FB-DIMMs is the ability to throttle the individual DIMMs. In addition, thermal sensors have been embedded on DIMMs, thereby resulting in DIMM temperature feedback.

Throttling system components such as processors or memory effectively reduces the operating speed of the throttled component, which, in turn, reduces the overall operating speed of the system having throttled components. Thus, under thermal throttle conditions, the end-user will see moderate to significant general slow-down of their systems.

Additionally, in some circumstances, even throttling of components, such as memory and/or processors is insufficient to address thermal issues encountered by a computing platform. For example, high density computing nodes having limited cooling surface areas and significant computing power per square meter, as well as very high power dissipation on subcomponents (e.g., in the range of 10 Watts/FB-DIMM) results in situations making the thermal environments a critical situation. In such systems, a change to the cooling environment, such as a ventilation failure, may result in thermal runaway scenarios during which even full throttling of all the memory and processor components is insufficient to keep the platform in an operating state.

DETAILED DESCRIPTION

Figure 1:
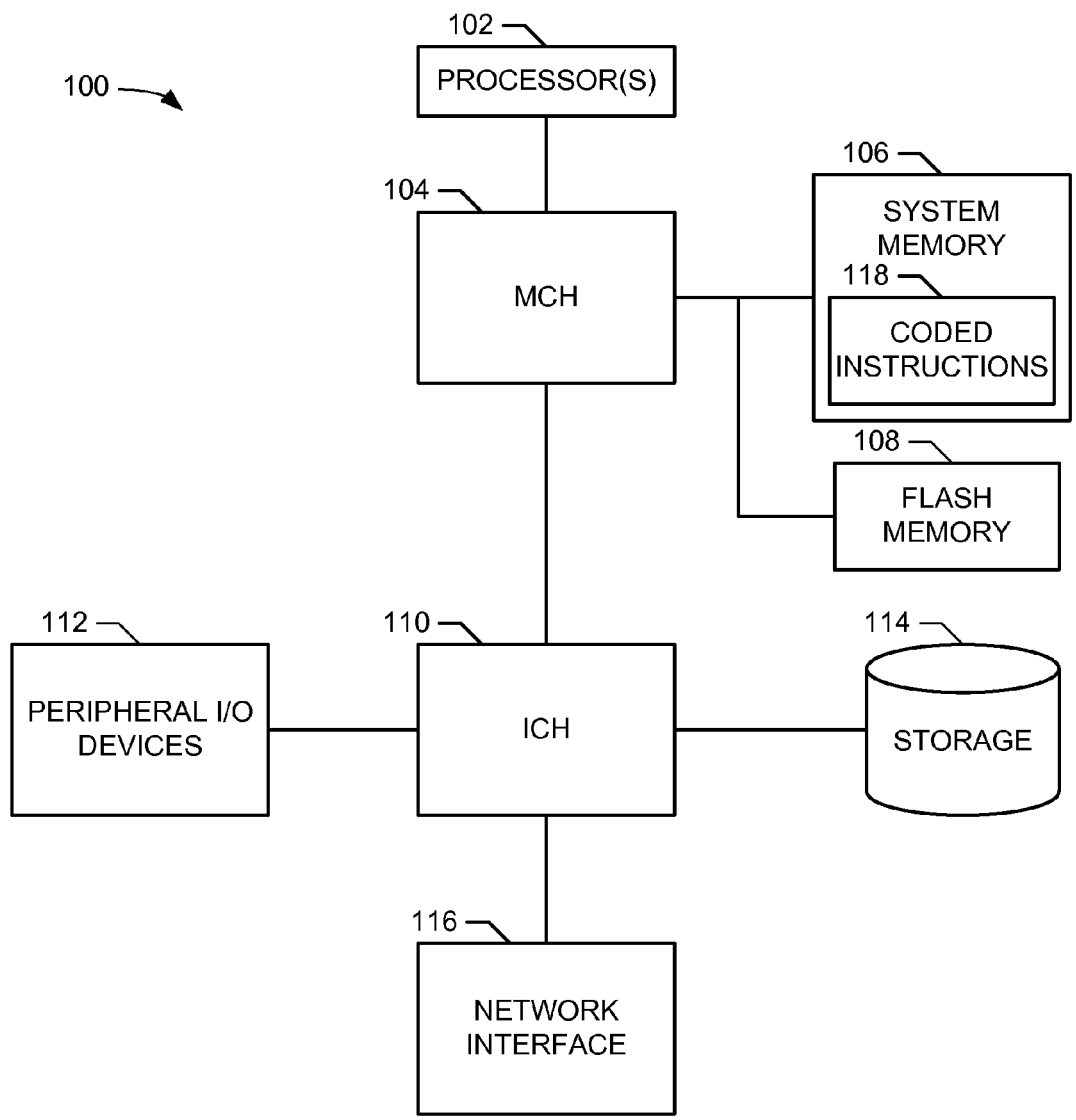
FIG. 1 is a block diagram of an example system that may be programmed to implement throttling management processes and systems.

FIG. 1 is a block diagram of an example system 100 to perform throttling management. For example, the methods and apparatus disclosed herein may be used as part of an implementation of a computer platform software or firmware system. In general, the example methods and apparatus described herein may be used to monitor platform performance and, in particular, platform performance related to component throttling and/or power consumption. As described below, according to one example, the method and system may detect memory throttling and reallocate contents of the throttled memory to alternate memory locations that are not throttled. Such an arrangement may minimize user-perceived slow down during throttling. In another example, a system and method may monitor system temperature and may disable one or more memory devices in response to a high system temperature. Of course, these two example methods and systems may be combined to result in a system that can relocate memory contents during throttling and can disable memory when the temperature of the system reaches a critical level.

The example system 100 includes a processor 102, a memory controller hub (MCH) 104, system memory 106, flash memory 108, an integrated controller hub (ICH) 110, peripheral input/output (I/O) devices 112, a storage 114, and a network interface 116.

The processor 102 can be implemented using one or more Intel® microprocessors from the Pentium® family, the Itanium® family, the XScale® family, or the Centrino™ family. Of course, other processors from other families and/or other manufacturers are also appropriate. While the example system 100 is described as having a single processor 102, the system 100 may alternatively have multiple processors. In fact, the system 100 may be equipped with multiple sockets, each of which may accommodate a single or multi-core processor. In one example implementation, the processor 102 is a virtual threading processor/chipset, which is a device or set of devices capable of supporting multiple threads of software execution, wherein computational resources are selectively allocated to the various threads of execution. One example virtual threading processor/chipset is the Intel Pentium 4 processor. The processor 102 includes a local memory (not shown), and executes coded instructions present in the local memory, coded instructions 118 present in the system memory 108, and/or coded instructions in another memory device. The processor 102 may also execute firmware instructions stored in the flash memory 108 or any other instructions transmitted to the processor 102.

In the example of FIG. 1, the processor 102 is coupled with the MCH 104. The MCH 104 serves as an interface between the processor 102, which may be executing firmware (e.g., a basic input/output system (BIOS)) and/or software (e.g., an operating system or any other software application), and the system memory 106 and the flash memory 108. The MCH 104 also acts as an interface between the processor 102 and the system components coupled to the ICH 110.

Figure 2:
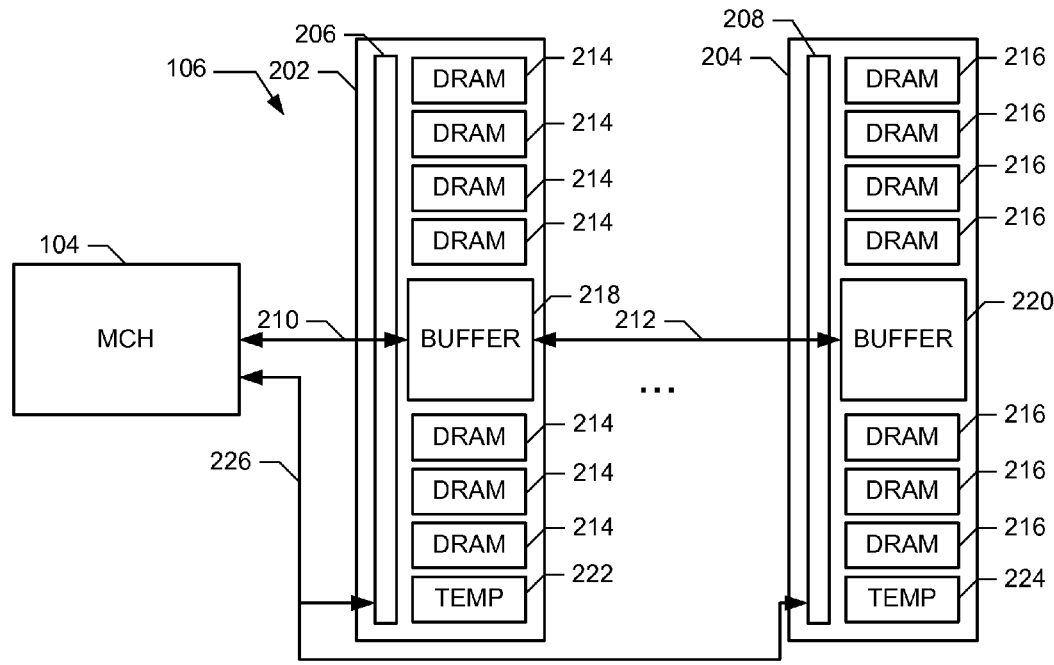
FIG. 2 is a block diagram showing additional detail of an example implementation of the system memory of FIG. 1.

As described in further detail in conjunction with FIG. 2, the system memory 108 may be any volatile and/or non-volatile memory that is connected to the MCH 104 via, for example, a bus. For example, volatile memory may be implemented using double-data-rate two synchronous dynamic random access memory (DDR2)-based FB-DIMMs having Dynamic Random Access Memory (DRAM) chips thereon. Alternatively or additionally, the system memory may be Synchronous Dynamic Random Access Memory (SDRAM), RAMBUS Dynamic Random Access Memory (RDRAM), and/or any other type of random access memory device.

The flash memory 108 may be used to back one or more portions of system memory 106. For example, the flash memory 108 may be, for example, a 1 gigabyte (GB) NAND-based flash device having an operating power range between about 3.3 milliwatts (mW) and about 108 mW. Although shown separately from the system memory 106 in FIG. 1, the flash memory 108 may be considered to be part of system memory 106 and may be addressable or accessible in a similar manner to system memory 106. The flash memory 108 may store instructions and/or data (e.g., instructions for initializing the system 100). For example, the flash memory 108 may store BIOS software/firmware. The BIOS software/firmware may be an implementation of the Extensible Firmware Interface (EFI) as defined by the EFI Specifications, version 2.0, published January 2006, available from the Unified EFI Forum.

The ICH 110 provides an interface to the peripheral I/O devices 112, the storage 114, and the network interface 116. The ICH 110 may be connected to the network interface 116 using a peripheral component interconnect (PCI) express (PCIe) interface or any other available interface.

The peripheral I/O devices 112 may include any number of input devices and/or any number of output devices. The input device(s) permit a user to enter data and commands into the system 100. The input device(s) can be implemented by, for example, a keyboard, a mouse, a touchscreen, a track-pad, a trackball, isopoint and/or a voice recognition system. The output devices can be implemented, for example, by display devices (e.g., a liquid crystal display, a cathode ray tube display (CRT), a printer and/or speakers). The peripheral I/O devices 112, thus, typically include a graphics driver card. The peripheral I/O devices 112 also include a communication device such as a modem or network interface card to facilitate exchange of data with external computers via a network (e.g., an Ethernet connection, a digital subscriber line (DSL), a telephone line, coaxial cable, a cellular telephone system, etc.).

The storage 114 is one or more storage device(s) storing software and data. Examples of storage 114 include floppy disk drives, hard drive disks, compact disk drives, and digital versatile disk (DVD) drives.

The network interface 116 provides an interface to an external network. The network may be any type of wired or wireless network connecting two or more computers.

As shown in FIG. 2, the system memory 106 may include one or more memory modules, two of which are shown at reference numerals 202 and 204. Each of the memory modules 202, 204, of which there may be as many as eight, may be FB-DIMM modules having DDR2 connectors 206, 208 having unique keys. The DDR2 connectors 206, 208 are coupled to the MCH 104 through one or more busses 210, 212, which may include different numbers of lines in transmit and receive directions. In one example implementation, the busses 210, 212 may use series signaling similar to PCI. For example, in the transmit path from the MCH 104 there may be 10 bus lines, whereas in the receive path at the MCH 104 there may be 14 bus lines.

Each of the memory modules 202, 204 includes a number of DRAM chips, which are shown at reference numerals 214 and 216, and a buffer 218, 220, which may be an advanced memory buffer (AMB). Additionally, each memory module 202, 204 includes a thermal or temperature sensor 222, 224. The thermal sensors 222, 224 are coupled to the MCH 104 via a system management bus (SMBus) 226. The thermal sensors report the temperatures of their respective memory modules. In one example, a temperature set point may be configured such that when the temperature of a memory module traverses the set point, a processor interrupt is triggered and sent to the MCH 104 over the SMBus 226. Thus, when a memory module exceeds a temperature at which throttling is started, thereby slowing accesses to that memory module, the thermal sensor will report such a temperature to the MCH 104 via the SMBus 226. Thus, the thermal sensors can communicate thermal throttling scenarios to the processor 102 via the MCH 104 using the buffers 218, 220.

Figure 3:
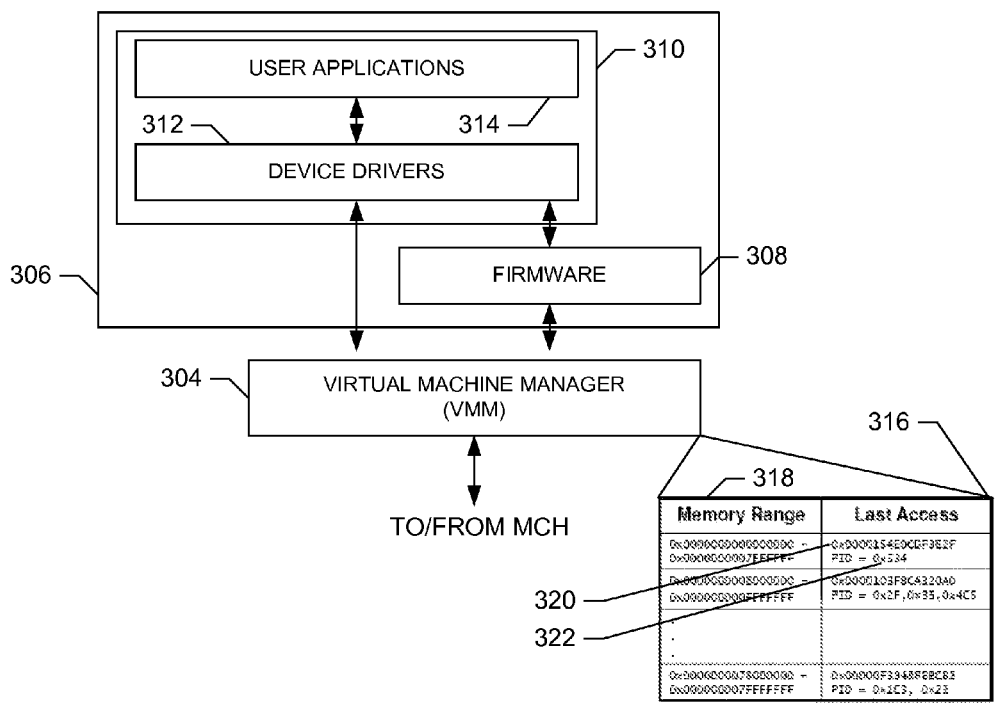
FIG. 3 is a block diagram of an example implementation of a virtual machine and a virtual machine manager that may be implemented using a programmed processor of FIG. 1.

In one example, software and/or firmware executed by the processor 102 of the system 100 of FIG. 1 may have an architecture 300, such as that shown in FIG. 3. In particular, the architecture 300 may be based on a virtual threading processor/chipset, such as the processor 102 of FIG. 1, on which a virtual machine monitor (VMM) 304 operates. The VMM 304 supports one or more virtual machines (VMs), one of which is shown at reference numeral 306 in FIG. 3. In one example, the VM 306 includes firmware 308 and an OS 310, which includes one or more device drivers 312 and one or more user applications 314.

In one example, the VMM 304 is hardware executing software and/or firmware. As explained below, instructions may be stored in memory (e.g., the system memory 106 or the flash memory 108) and executed by a processor (e.g., the processor 162) to implement the VMM 304, as well as to control the functionality of the VMM 304. As will be readily appreciated by those having ordinary skill in the art, the VMM 304 forms and maintains a framework for managing virtual machines. In particular, the VMM 304 provides memory management, interrupt handling, and thread scheduling services to the virtual machines (e.g., the VM 306) it supports.

As described below in detail, the VMM 304 may report to the VM 306 the resources available for the execution of program instructions and/or other system resources that are available. To that end, the VMM 304 may inform the VM 306 that a subset of resources is available when, in reality, the resources are fully available.

The VM 306 may be implemented using a dynamic programming language such as, for example, Java and for C#. A software engine (e.g., a Java Virtual Machine (JVM) and Microsoft.NET Common Language Runtime (CLR), etc.), which is commonly referred to as a runtime environment, executes the dynamic program language instructions of the managed application. The VM 306 interfaces dynamic program language instructions (e.g., a Java program or source code) to be executed and to a target platform (i.e., the virtual threading processor/chipset 302 and the OS 310) so that the dynamic program can be executed in a platform independent manner.

Dynamic program language instructions (e.g., Java instructions) are not statically compiled and linked directly into native or machine code for execution by the target platform (i.e., the operating system and hardware of the target processing system or platform). Native code or machine code is code that is compiled down to methods or instructions that are specific to the operating system and/or processor. In contrast, dynamic program language instructions are statically compiled into an intermediate language (e.g., bytecodes), which may interpreted or subsequently compiled by a just-in-time (JIT) compiler into native or machine code that can be executed by the target processing system or platform. Typically, the JIT compiler is provided by the VM that is hosted by the operating system of a target processing platform such as, for example, a computer system. Thus, the VM and, in particular, the JIT compiler, translates platform independent program instructions (e.g., Java bytecodes, Common Intermediate Language (CIL), etc.) into native code (i.e., machine code that can be executed by processor 102).

The firmware 308 within the VM 306 may be programmed to carry out tasks for the VM 306 prior to the VM 306 booting the OS 310 and its attendant device drivers 312 and user applications 314. For example, the firmware 308 may be responsible for interfacing with the VMM 304 to determine the capabilities of hardware coupled to the virtual threading processor/chipset 302. In particular, as described below, the firmware 308 may request an indication of display screen resolution from the VMM 304. The firmware 308 may store the resource indications in a memory (e.g., random access memory (RAM)), so that when the OS 310 boots, the OS 310 will be aware of the system resources at its disposal.

As will be readily appreciated by those having ordinary skill in the art, the OS 310 may include the device drivers 312 that are in communication with the user applications 314. The loading of the OS 310 causes the architecture 300 to leave the pre-boot phase of operating and to enter the runtime operating phase. The OS 310 learns what resources are at its disposal by reading the memory locations into which the firmware 308 stored the system information provided by the VMM 304. Alternatively, the OS 310 may communicate directly with the VMM 304 to obtain an indication of the available resources. The OS 306 is told what hardware resources are available by either the memory manipulated by the firmware 308 or by the VMM 304 and, thus, the OS 306 may be under an assumption that fewer or different resources are available than those resource actually available.

As described below, the VMM 304 may maintain a memory access list 316 tracking memory ranges 318, last accesses to the memory ranges 320, and a process identification (PID) 322 of the entity (e.g., an operating system or some other software) that made the last access to that memory range.

Having described the architecture of one example system that may be used for throttling management, two throttling management processes are described. These processes may be executed and/or implemented using the example architecture of FIG. 3, or using any other suitable configuration. Although the following discloses example processes, it should be noted that these processes may be implemented in any suitable manner. For example, the processes may be implemented using, among other components, software or firmware executed on hardware and/or machine readable instructions on a machine accessible medium or media that are executed by a processor. However, these are merely examples and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software.

Additionally, some portions of the process may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes.

Figure 4:
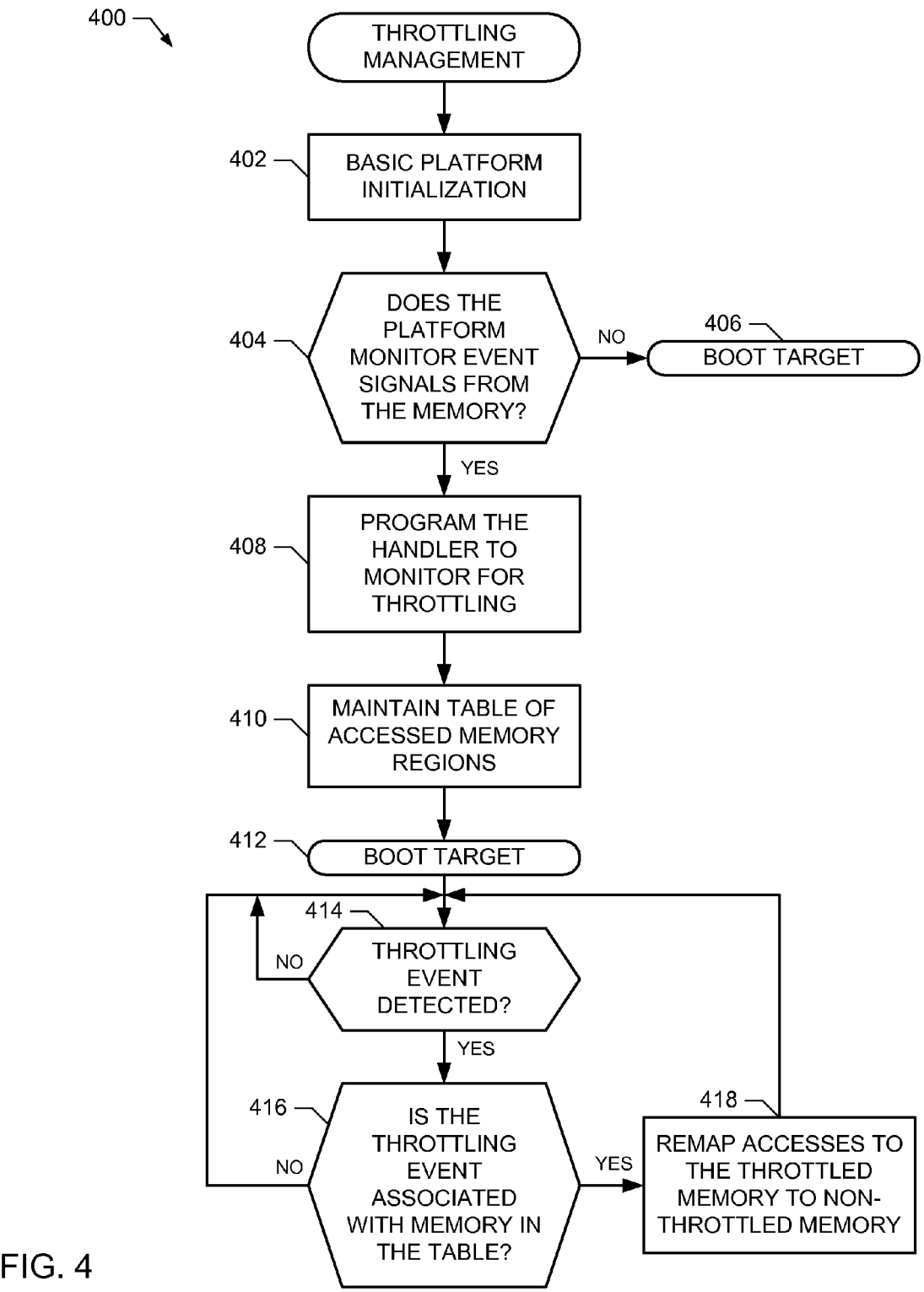
FIG. 4 is a flowchart representative of an example throttling management process that may be carried out by the example system of FIG. 1.

Portions of a throttling management process 400 of FIG. 4 may be carried out at power-up or processor reset, while other portions may be carried out during runtime or during execution of a VMM and/or a VM. The process of FIG. 4 is shown operating in both a pre-boot environment and a runtime environment, the delineation between the two operating states being the boot target process.

The process 400 begins by performing a basic platform initialization, which may include various tasks carried out in a pre-boot environment, such as BIOS (block 402). After basic platform initialization (block 402), the process 400 determines if the platform monitors event signals from the memory or memory sub-system (block 404). For example, the process 400 may determine, based on the type of memory components resident within the platform, whether thermal messaging, such as the sending of interrupts at temperature trip points, is available. As will be readily appreciated by those having ordinary skill in the art, the messaging may be carried out over an SMBus, such as the SMBus 226 connecting the memory modules 206, 208 to the MCH 104.

If the platform does not support monitoring of signals from the memory or memory sub-systems (block 404), the process 400 proceeds to boot the boot target, thereby loading an operating system such as Windows, Linux, or the like (block 406). From this point forward, because the platform does not include monitoring functionality, the OS runtime operation of the system proceeds in a conventional manner.

If, however, the platform does monitor event signals from the memory (block 404), an event hander, such as an interrupt event handler, is programmed to monitor for throttling signals from the memory modules (block 408). For example, in a pre-boot environment, the interrupt event handler may be programmed to mask certain interrupts and to trap interrupts indicative of high memory module temperature and/or memory module throttling. As will be readily appreciated by those having ordinary skill in the art, memory module throttling may be carried out on a memory module-by-memory module basis. Thus, the interrupt handler may be programmed to recognize throttling from each memory module and will be able to determine which memory modules are being throttled.

After the handler is programmed to monitor for throttling (block 408), the process 400 initializes and maintains a table of accessed memory locations or regions (block 410). The table of accessed memory locations may be a list of last accessed memory ranges within a certain tolerance (e.g., a certain number of time/ticks) and its associated process ID The process ID may be provided by platform driver assistance. The table tracks active memory for active processes and notes which are most likely to be accessed. For example, with reference back to FIG. 3, the table of accessed memory locations or regions may be as shown at reference numeral 316, wherein memory ranges are identified, as is last access information, such as the address or identified of each accessing entity. The table may be used to determine which memory modules are most likely to affect system performance when throttling occurs. As explained in detail below, the table initialized and maintained at block 410 will be used to remap memory accesses when a throttled memory is detected.

After the handler and the table of memory accesses are configured (blocks 408 and 410), the process 400 takes the platform (e.g., the example system 100) into a runtime phase of operation by booting a target operating system (block 412).

In runtime operation, the process 400, which may be carried out by, for example, a VMM or one or more VMs, detects whether a throttling event has occurred (block 414). For example, the MCH 104 and/or the processor(s) 102 may monitor the SMBus 226 for interrupt event signals indicating that one or more memory modules (e.g., one or more of the memory modules 202 and 204) is being throttled or has reached an over-temperature state that is associated with throttling.

When throttling or over-temperature conditions are detected (block 414), the process 400 determines whether the throttling event, which is represented by, for example, signals on the SMBus 226, is associated with memory in the table initialized and maintained by block 410 (block 416). In one example, if the throttling event is not associated with memory in the table, no action can be taken and the process continues to look for throttling events (block 414).

If, however, according to this same example, the throttling event is associated with memory in the table (block 416), the process 400 remaps the contents of the throttled memory to a non-throttled memory (block 418). For example, if a first memory module is being throttled, the contents of that first memory module may be relocated to a second memory module that is not being throttled. Subsequent requests made by hardware, software, and/or firmware to access memory locations in the first memory module are routed to the second memory module. In this manner, the first memory module, which is being throttled, does not slow the operation of the entire system. Rather, the operation of the system continues at an essentially normal speed, owing to the fact that the throttled memory no longer needs to be accessed because its contents are found in another location that is not being throttled. Of course, rather than relocating contents of a throttled memory module to a second memory module, the contents may be located to another location such as flash memory where pages of information may be stored.

Of course, there are example implementations that do not need to employ the table of accessed memory. For example, there may be other methods by which contents from a throttled memory module may be located to a non-throttled memory module that do not include the use of a memory access table.

Figure 5:
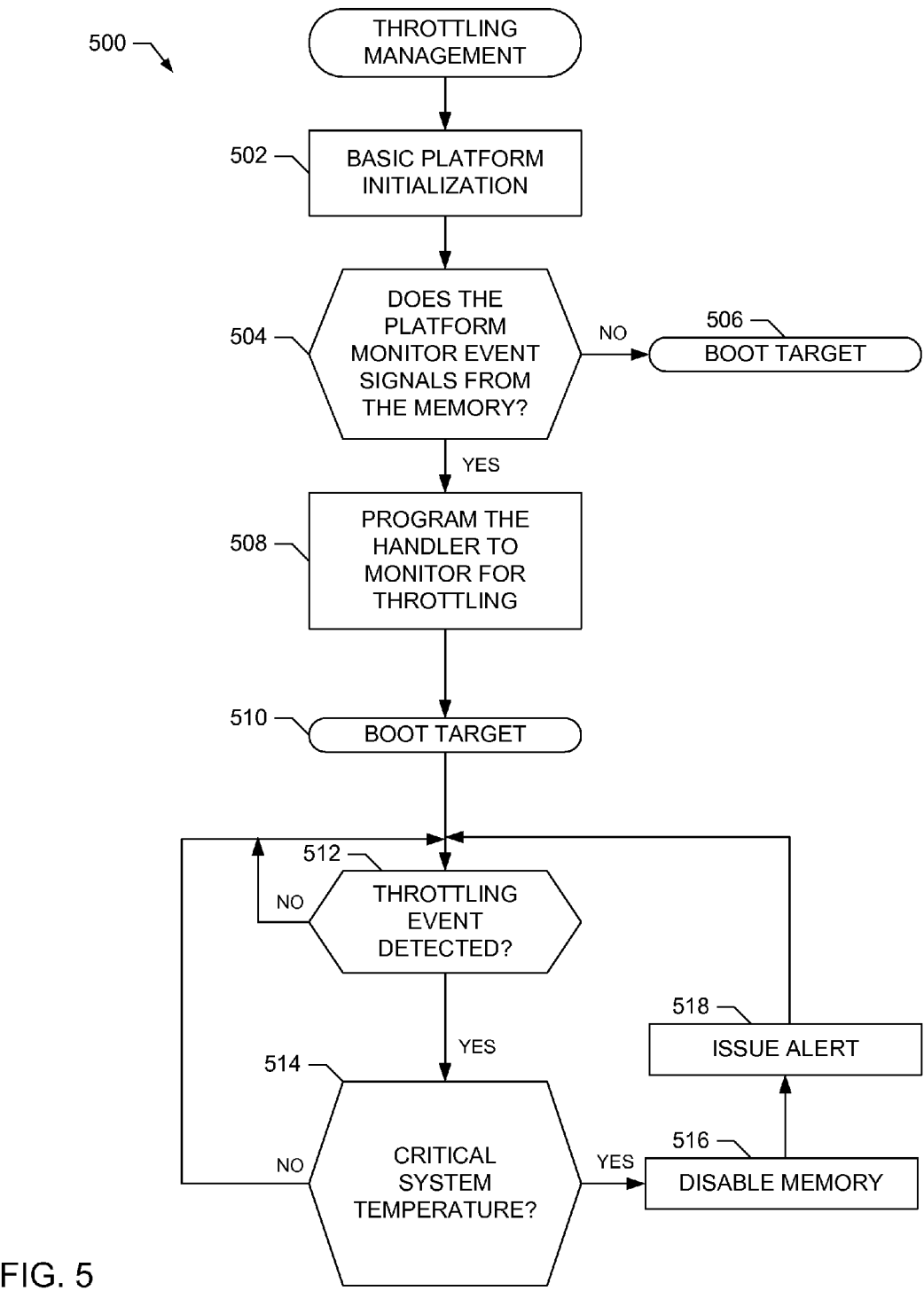
FIG. 5 is a flowchart representative of a second example throttling management process that may be carried out by the example system of FIG. 1.

An alternate throttling management process 500 is shown in FIG. 5. The blocks 502, 504, 506, and 508 may be performed identically or substantially identically to the corresponding blocks 404, 404, 406, and 408 of FIG. 4. Thus, the details of the descriptions of these blocks will not be repeated.

After the handler has been programmed to monitor for throttling, the process 500 transitions into a runtime mode of operation by booting a target operating system (block 510). Subsequently, the process 500 via a VMM and/or VMs monitors for throttling events 512. As described above, the throttling event may be monitored by detected by monitoring the temperature of one or more memory modules within the system (e.g., by monitoring the temperatures of the memory modules 202 and 204 of the example system 100).

If a throttling event is detected (block 512), the process 500 determines whether the system temperature is at a critical level (block 514). For example, in a racked server environment, critical system temperature may be determined by evaluating a reading from a temperature probe within the server cabinet, or by receipt of an interrupt indicating that system temperature, as opposed to just the temperature of a memory module, is at a critical level.

If system temperature is not at a critical level (block 514), the process 500 continues to monitor for throttling events (block 512) and continues to monitor for critical system temperatures (block 514). However, when system temperature reaches a critical level (block 514), the process 500 disables one or more of the throttled memory devices (block 516) and issues an alert (block 518).

The alert may report the occurrence of an Advanced Configuration and Power Interface (ACPI) hot unplug event in which VMM is made aware that it has fewer resources at its disposal and reallocated memory and processing functionality accordingly amongst its VMs. Alternatively, an operating system may receive the alert and determine that the hot unplug event occurred and may, itself, reallocate its processes among the now-reduced memory resources. In this manner of operation, the hot unplug is a known event and is handled either by a VMM, a VM, or an operating system in a standard manner. Thus, the temperature of the system may be kept below a critical level even when throttling itself is not sufficient to maintain control of the system temperature.

While the foregoing has described the process 500 as operating in the context of a hot unplug event, it should be noted that other techniques may be used to disable a throttled memory to maintain system temperature at a sub-critical level. For example, if flash memory (e.g., the flash memory 108) is available, the throttled memory may be disabled after moving its contents to a flash memory or some other available memory, such as a hard drive. If this is carried out, the alert issued by the process 500 (block 518), informs the system that the prior memory locations have been remapped to the flash memory or to some other memory and that the prior memory locations have been disabled. The remapping of memory to flash memory may include paging memory into flash memory As will be readily appreciated by those having ordinary skill in the art, a system may incorporate aspects of the process 400 with the process 500. In one example, such a system would detect memory throttling and relocate the contents of the throttled memory to another memory in an attempt to maintain current user-perceived system operating speed. If, however, the throttling of the memory is not sufficient to maintain system temperature at a sub-critical level, the throttled memory could be disabled or otherwise taken offline and overall system resources such as memory and processing may be reallocated. In such a configuration, the system first attempts to maintain the user experience at a high level and, if the system is still in jeopardy of reaching critical temperature, certain components of the system may be shut down and the remaining resources reallocated.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to manage throttling in computing environment, the method comprising:
   receiving an indication that a first memory module has reached a temperature;
   remapping information from the first memory module to a second memory in response to the received indication; and
   maintaining a structure indicating portions of the first memory module that have been accessed.

2. A method as defined in claim 1, wherein the second memory comprises a second memory module.

3. A method as defined in claim 1, wherein the second memory comprises flash memory.

4. A method as defined in claim 1, wherein the second memory comprises a hard drive.

5. A method as defined in claim 1, wherein receiving the indication comprises receiving an interrupt from the first memory module.

6. A method as defined in claim 5, wherein receiving the indication comprises receiving signals from a system management bus.

7. A method as defined in claim 1, further comprising receiving an indication that a system in which the first memory module and the second memory reside has reached a system temperature.

8. A method as defined in claim 7, further comprising disabling the first memory module in response to the indication that the system has reached a system temperature.

9. A method to manage throttling in computing environment, the method comprising:

receiving an indication that a first memory module has reached a temperature;

remapping information from the first memory module to a second memory in response to the received indication;

receiving an indication that a system in which the first memory module and the second memory reside has reached a system temperature; and disabling the first memory module in response to the indication that the system has reached a system temperature, wherein disabling the first memory module comprises performing Advanced Configuration and Power Interface hot unplug operation.

10. An article of manufacture comprising a machine-accessible medium having a plurality of machine accessible instructions that, when executed, cause a machine to:

receive an indication that a first memory module has reached a temperature;

remap information from the first memory module to a second memory in response to the received indication; and maintain a structure indicating portions of the first memory module that have been accessed.

11. A machine-accessible medium as defined by claim 10, wherein the second memory comprises a second memory module.

12. A machine-accessible medium as defined by claim 10, wherein the second memory comprises flash memory.

13. A machine-accessible medium as defined by claim 10, wherein the second memory comprises a hard drive.

14. A machine-accessible medium as defined by claim 10, wherein receiving the indication comprises receiving an interrupt from the first memory module.

15. A machine-accessible medium as defined by claim 14, wherein receiving the indication comprises receiving signals from a system management bus.

16. A machine-accessible medium as defined by claim 10, wherein the plurality of machine accessible instructions, when executed, cause a machine to receive an indication that a system in which the first memory module and the second memory reside has reached a system temperature.

17. A machine-accessible medium as defined by claim 16, wherein the plurality of machine accessible instructions, when executed, cause a machine to disable the first memory module in response to the indication that the system has reached a system temperature.

18. A machine-accessible medium as defined by claim 17, wherein disabling the first memory module comprises performing Advanced Configuration and Power Interface hot unplug operation.

* * * * *